(12) United States Patent
Burns et al.

(10) Patent No.: US 8,225,505 B2
(45) Date of Patent: Jul. 24, 2012

(54) METHOD OF FORMING A ROTATING BLADE ASSEMBLY

(75) Inventors: Michael L Burns, Derby (GB); Peter Broadhead, Derby (GB)

(73) Assignee: Rolls-Royce, PLC, London (GB)

( * ) Notice: Subject to any disclaimer, the term of this patent is extended or adjusted under 35 U.S.C. 154(b) by 454 days.

(21) Appl. No.: 12/457,688

(22) Filed: Jun. 18, 2009

(65) Prior Publication Data

US 2009/0317245 A1    Dec. 24, 2009

(30) Foreign Application Priority Data

Jun. 24, 2008 (GB) .................. 0811501.6

(51) Int. Cl.
*F02K 7/00* (2006.01)

(52) U.S. Cl. .......................... 29/889.2; 415/9

(58) Field of Classification Search ........... 415/9, 198.1, 415/208.2, 209.1, 209.2, 209.3; 416/204 R, 416/213 R, 214 R, 214 A; 29/889.2, 889.21, 29/889.22, 525.01
See application file for complete search history.

(56) References Cited

U.S. PATENT DOCUMENTS

| | | | | |
|---|---|---|---|---|
| 2,951,677 A | * | 9/1960 | Howald | ................. 416/201 R |
| 2004/0034998 A1 | * | 2/2004 | Beacom | ...................... 29/889.2 |

FOREIGN PATENT DOCUMENTS

GB    2 030 657 A    4/1980

* cited by examiner

*Primary Examiner* — Edward Look
*Assistant Examiner* — Christopher R Legendre
(74) *Attorney, Agent, or Firm* — Oliff & Berridge, PLC

(57) ABSTRACT

A method of forming a blade assembly for a gas turbine engine, the method comprising mounting turbine blades on a rotor in a number of radial stages. Sacrificial supports are placed on the blades, and nozzle guide vanes are located on the supports. The rotor is introduced into a casing, and the guide vanes are mounted to the casing.

10 Claims, 7 Drawing Sheets

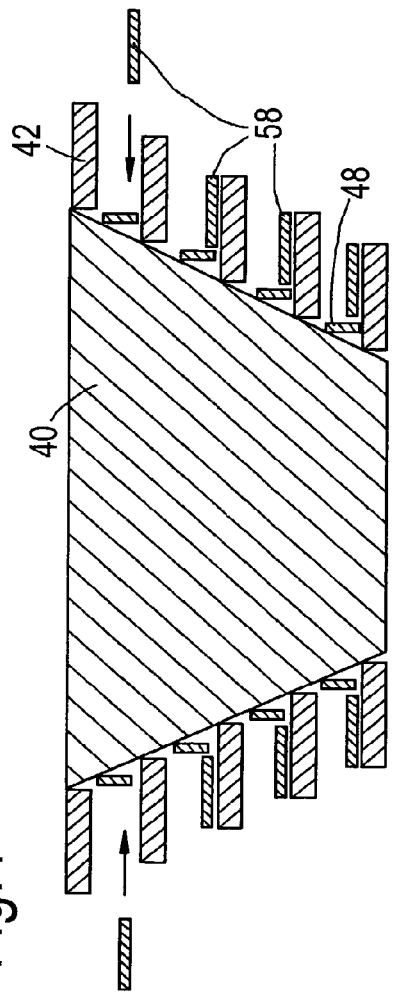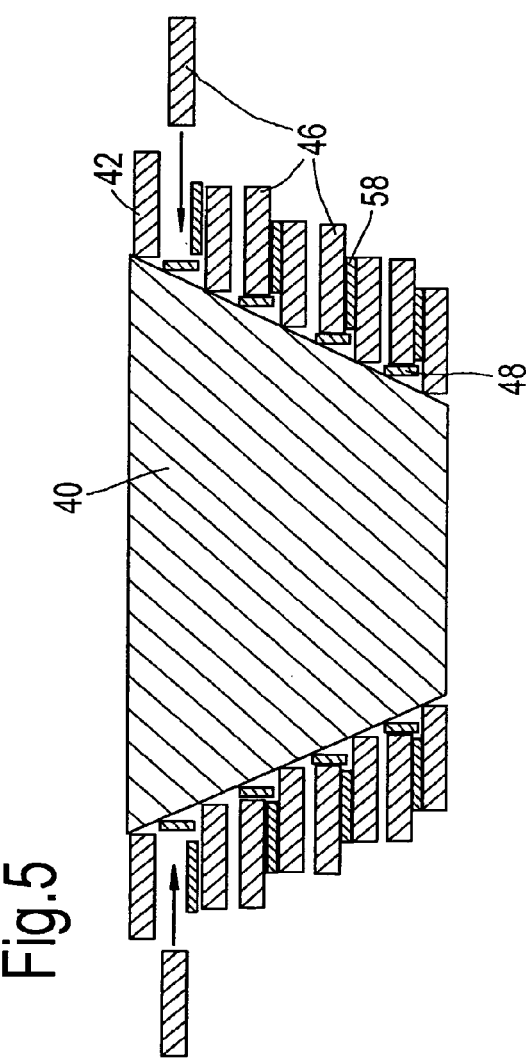

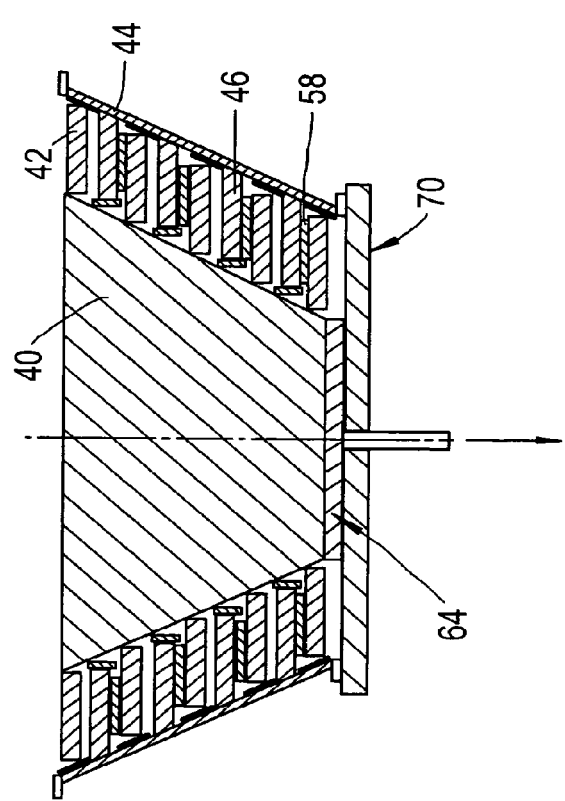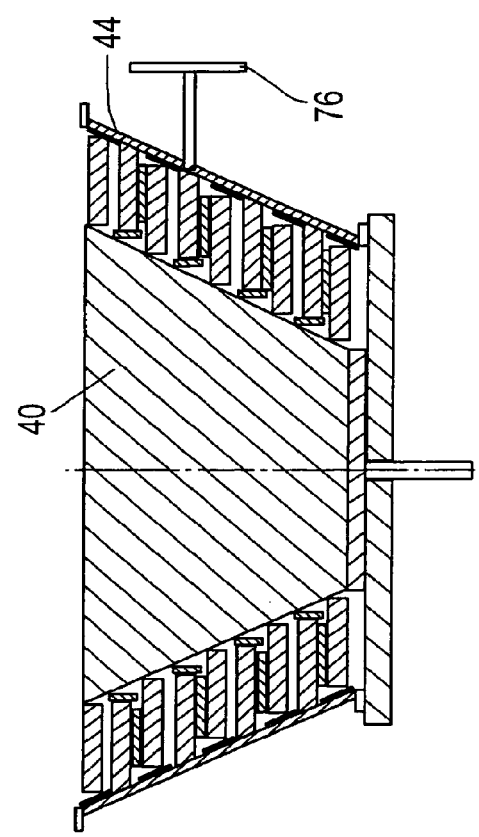

METHOD OF FORMING A ROTATING BLADE ASSEMBLY

The present invention relates to a method of forming rotating blade assemblies, a method of forming a turbine assembly for a gas turbine engine, a rotating blade assembly, a turbine assembly for a gas turbine engine, and also a gas turbine engine.

BACKGROUND

The term "rotating blade assembly" when used in the specification is to be understood as referring to an assembly including a rotor mounting a plurality of blades, some of which blades are axially spaced relative to each other on the rotor. The rotor is rotatably mounted in a casing, with a number of stators provided on the casing, with the blades passing between the stators during rotation. Such assemblies may typically be used as turbines or compressors, and particularly in gas turbine engines such as are used on aircraft.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts 26, 28, and 30.

In view of the above it will be understood that the provision of rotating blade assemblies for gas turbine engines requires an intricate and relatively complex assembly of blades on a rotor disk or core. A traditional blade assembly such as that used in a low pressure turbine module comprises a number of individual turbine disks which are bolted together on final assembly to produce the low pressure turbine module. The individual blades are secured to the disks and then each disk is bolted to adjacent disks by a bolted flange joint provided on a drive element. Each disk will require individual balancing.

In order to achieve the above assembly, each turbine disk requires machining after a forging process. The forging process to allow machining must include the drive element which means that the forged section is generally much larger in cross section than the final machined part. This means there is a significant additional volume of material used, and an additional machining process which adds to cost. Clearly, reducing the amount of material utilised would provide significant benefits with regard to raw material costs, particularly as most materials used will be relatively expensive in order to meet the temperature and other requirements within the blade assembly.

It is not uncommon for the drive element along with corresponding flanges, nuts, bolts and washers for a blade assembly to weigh as much as 20 kg.

SUMMARY

According to the present invention there is provided a method of forming a rotating blade assembly, the assembly including a rotor, a plurality of blades mountable on the rotor with some of the blades axially spaced relative to each other, and a casing in which the rotor is rotatably mountable, and a plurality of stators mountable on the casing such that the blades pass therebetween during rotation of the rotor, the method including mounting the blades on the rotor, locating removable supports on the blades with stators on the removable supports in required positions, introducing the rotor into the casing, and mounting the stators to the casing.

The removable supports may be located on the blades, with the stators being subsequently placed on the removable supports.

The removable supports may be sacrificial, and may be frangible such that upon rotation of the rotor the supports will break up and be ejected from the casing.

One or more inner circumferential seals may be mounted around the rotor extending between the blades following mounting of the blades on the rotor, and before locating the stators on the blades on the removable supports.

Each inner seal may be provided in two or more circumferential parts, which parts are located around the rotor and connected together to extend wholly therearound.

One or more outer circumferential seals may be mounted around the inside of the casing, prior to introduction of the rotor thereinto.

The rotor following introduction into the casing may be aligned relative to the casing, prior to mounting of the stators on the casing.

Alignable holes may be provided in the casing and the stators, and following alignment of the rotor on the casing, the stators may be mounted on the casing by locating mounting members extending through respective aligned holes in the casing and the stators.

The rotor and casing may each be located respectively on first and second assembly fixtures prior to introduction of the rotor into the casing, with the first assembly fixture rotatably engageable with the second assembly fixture to permit correct relative positioning of the rotor and casing, and to permit rotation of the rotor relative to the casing into a required relative alignment.

The invention also provides a method of forming a turbine assembly for a gas turbine engine, the method being according to any of the preceding ten paragraphs, with the blades being turbine blades and the stators being nozzle guide vanes.

The invention also provides a rotating blade assembly made by a method according to any of the preceding eleven paragraphs.

The invention further provides a turbine assembly for a gas turbine engine, the assembly including a single rotor with a plurality of turbine blades mounted radially thereon, a casing which locates the rotor, with a plurality of nozzle guide vanes mounted radially on the inside of the casing, such that the turbine blades can pass therebetween during rotation of the rotor.

The turbine blades and nozzle guide vanes may be arranged in a plurality of radial stages spaced axially along the assembly.

The invention still further provides a gas turbine engine incorporating a turbine assembly according to any of the above three paragraphs.

In accordance with aspects of the present invention there is provided a method of forming a blade assembly for a gas turbine engine, the method comprising providing an engine core assembly having connections for blades presented radially, the method characterised in that the engine core is provided as a whole assembly with blades arranged as radial blade stages spaced along a centre line of the engine core with vane elements between each blade stage presented upon sacrificial supports, the whole assembly located within a casing to allow securing of the vanes to the casing.

Generally, the blades are turbine blades.

Typically, the core is supported upon a platform during assembly with the blades.

Generally, the vanes are secured by dowels extending from the casing.

Typically, the sacrificial support comprises a foam or frangible material element located between the vane and an adjacent blade. Typically the sacrificial supports are fragmented upon rotation of the blades upon the core about the centre line.

Typically, the blades are located in slots or fir tree roots formed in the core.

Typically, the core and/or the blades include means for balancing rotation about the centre line.

Generally, the core is segmented.

Generally, the core has a drum or hollow cross section.

BRIEF DESCRIPTION OF DRAWINGS

FIGS. 2 to 9 are similar diagrammatic cross sectional side views sequentially showing a method according to the present invention being carried out to form a rotating blade assembly;

DETAILED DESCRIPTION

Embodiments of aspects of the present invention will now be described by way of example only and with reference to the accompanying drawings.

The drawings illustrate the carrying out of a method according to the invention of forming a low pressure turbine assembly for a gas turbine engine, as may be used in an aircraft. The assembly includes a single piece hollow frusto conical rotor 40, with five radial rows of turbine blades 42 mounted thereon. The rotor 40 locates in a casing 44 with four rows of nozzle guide vanes 46 located on the inside of the casing 44 so as to extend respectively between the rows of turbine blades 42.

Figure 1:
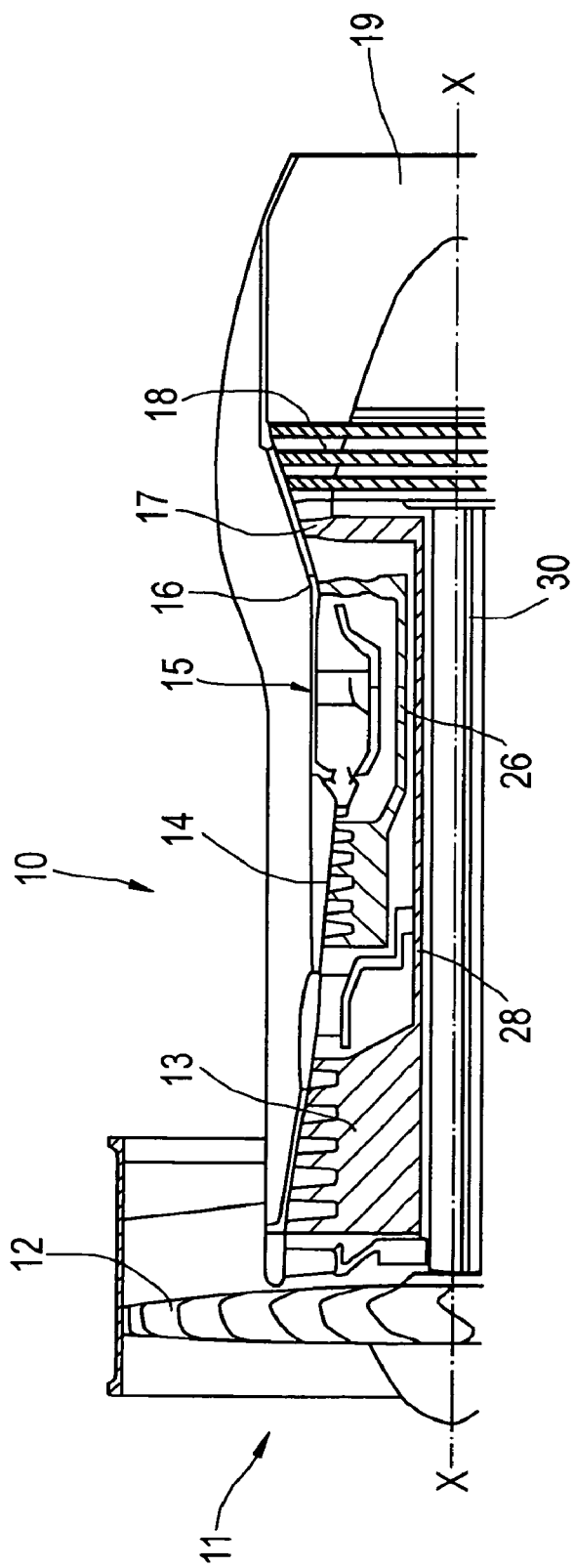
FIG. 1 is a conventional gas turbine engine.
Figure 2:
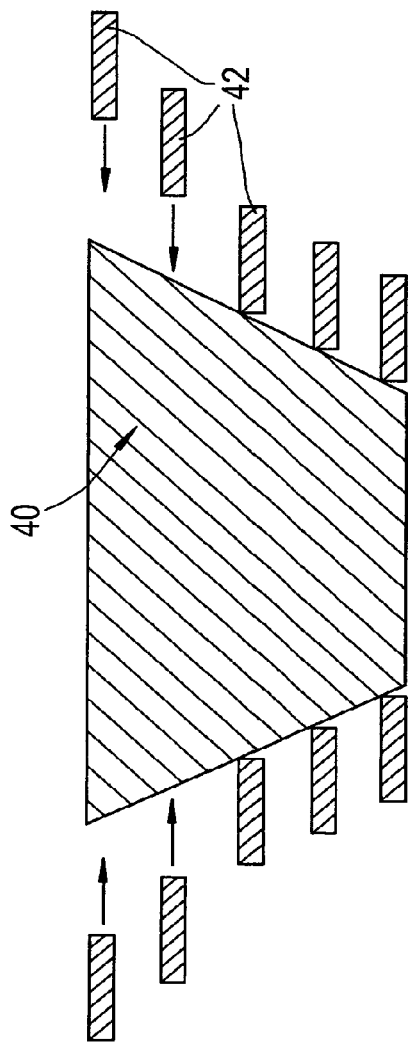

FIG. 2 shows the turbine blades 42 being mounted in required positions on the rotor 40. The blades 42 may be mounted on the rotor 40, or could at least initially be located thereon by slots or fir tree root portions.

Figure 3:
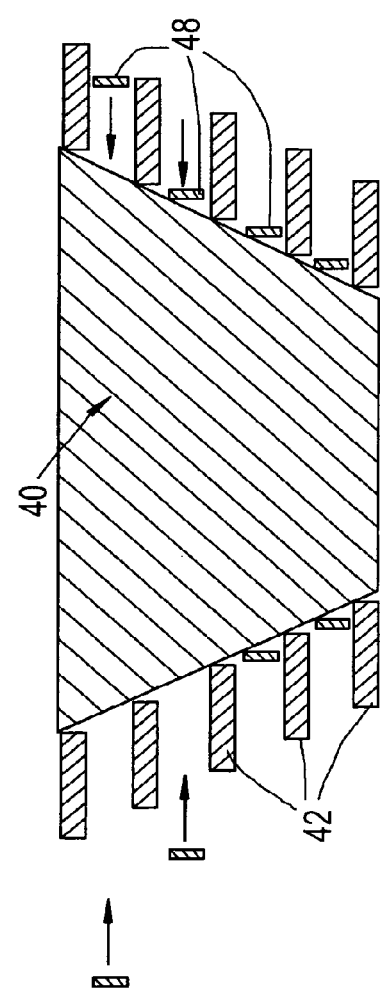
Figure 11:
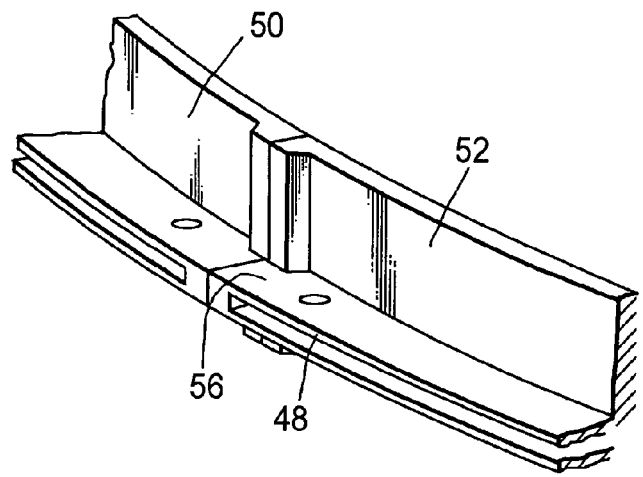
FIG. 11 is a detailed diagrammatic perspective view of a further part of the assembly made by a method according to FIGS. 2 to 9.

FIG. 3 shows the rotor 40 with all of the turbine blades 42 mounted thereon, and nozzle guide vane inner seals 48 being mounted on the rotor 40, extending circumferentially therearound between the rows of turbine blades 42. The inner seals 48 are formed of two parts 50, 52 which are located around the rotor 40, and then aligned with each other using vertical and horizontal bottom seal strips 56 (FIG. 11). The parts 50, 52 of the seals 48 are held together using top and bottom discourager seals which are bolted to the horizontal seal strips 56 on each part 50, 52.

Figure 10:
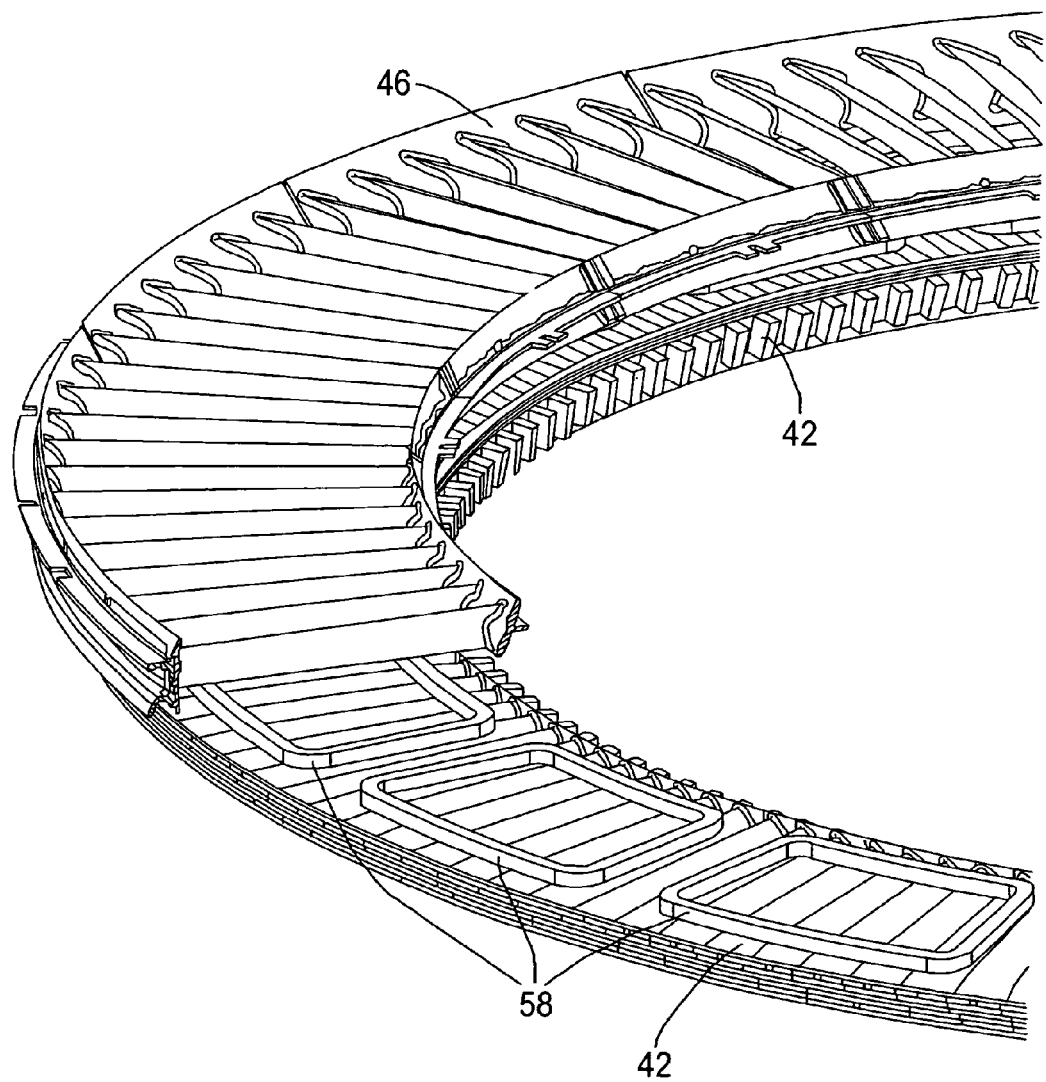
FIG. 10 is a detailed diagrammatic part cut away perspective view of part of the assembly formed by the method of FIGS. 2 to 9.

FIG. 4 shows the rotor 40 with the blades 42 and inner seals 48 mounted thereon. Removable spacers 58 are being located in required positions on the blades 42. The supports 58 may be made of foam or other frangible or easily fragmented material. FIG. 10 shows the supports 58 in the form of upstanding hollow upwardly open square members with rounded corners.

FIG. 5 shows the rotor 40 with the supports 58 provided on the lower (as shown) four rows of turbine blades 42. Nozzle guide vanes 46 are being placed on each of the supports 58 in required positions.

Figure 6:
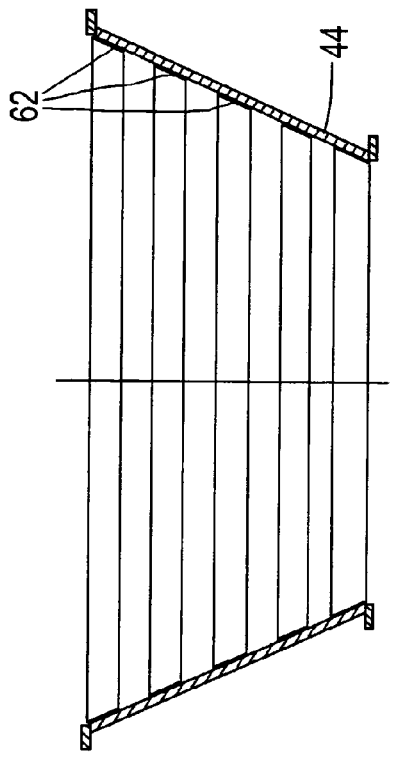

Rotor seal segments 62 in the form of circumferential rings are mounted on the inside of the casing 44 as shown in FIG. 6. The rotor 40 is mounted on a first assembly fixture 64 in the form of a platform 66 with a downwardly extending central finger 68. The casing 44 is mounted on a second assembly fixture 70 in the form of a platform 72 of a greater diameter than the platform 66, and with a central hole 74.

Figure 7:
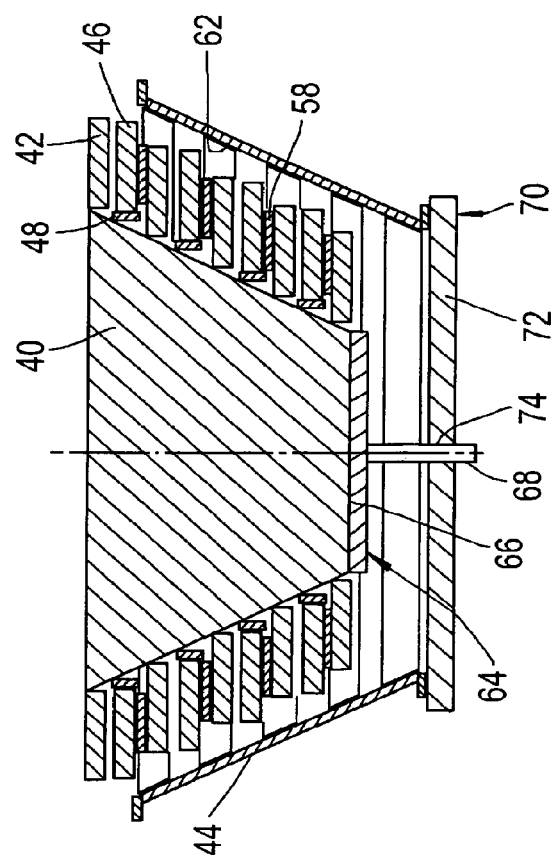

The rotor 40 being borne by the first assembly fixture 64 is introduced into the casing 44 as shown in FIGS. 7 and 8, with the finger 68 extending through the hole 74 to provide a correct position within the casing 44 for the rotor 40. Once the rotor 40 is fully within the casing 44, the rotor 40 can be rotated relative to the casing 44 using an alignment tool 76, as shown in FIG. 9.

Figure 12:
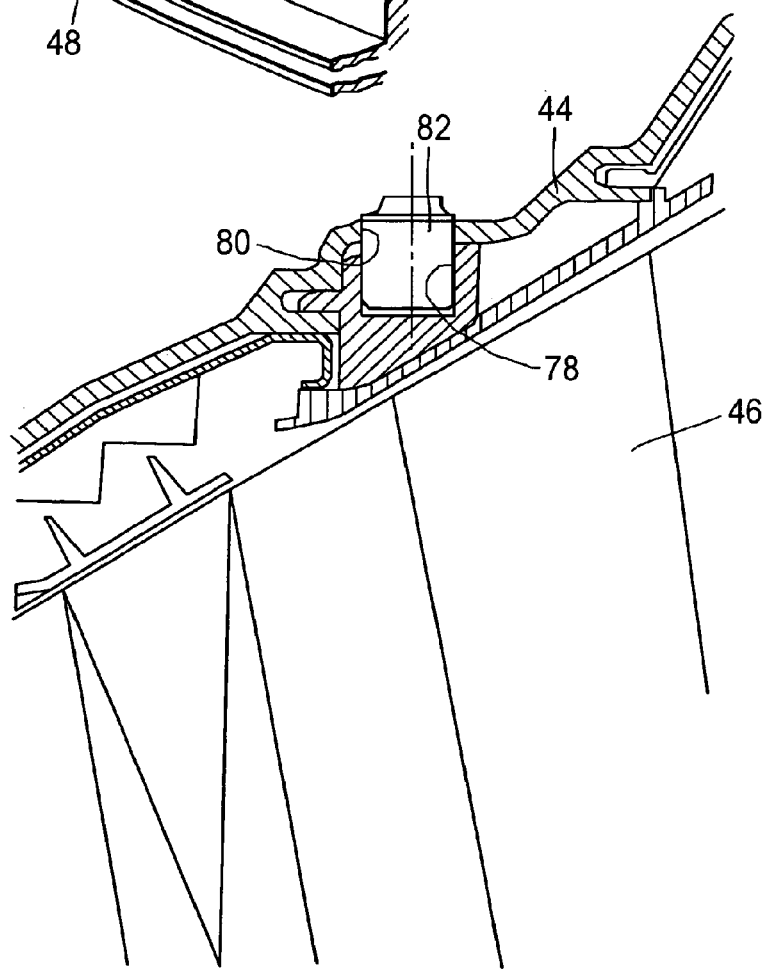
FIG. 12 is a diagrammatic cross sectional side view of a still further part of the assembly made by a method according to FIGS. 2 to 9.

Radial location holes 78, 80 are provided respectively in the nozzle guide vanes 46 and the casing 44, and the tool 76 is used to turn the rotor 40 to bring these holes 78, 80 into respective alignment. Once in alignment, the nozzle guide vanes 46 can be mounted on the casing 44 using dowels 82 as shown in FIG. 12. The dowels 82 extend through the aligned holes 78, 80, and typically will engage with a screw threaded in the respective casing hole 80.

The dowels 82 produce accurate and correct location of the vanes 46 on the casing 44. The dowels 82 provide axial and radial support against the operating forces typically generated by hot gas streams in a gas turbine engine.

Once the assembly has been fully assembled as outlined above, an initial rotation of the rotor 40 relative to the casing 44 will cause the supports 58 to break up and be ejected rearwardly.

There is thus described a method of forming a turbine assembly, and an assembly made by such a method, which provide for a number of advantages. This method enables the rotor and blades to be manufactured as a single component, thereby reducing weight, the time required in assembling the assembly, and therefore the cost of the overall assembly.

The rotor can be formed by forging with a less pronounced profile, thereby saving material costs and the degree of machining required during the manufacturing process. No nuts, bolts or washes are required to form the assembly, thereby providing a cost and quite significant weight saving.

Having only a single rotor as opposed to a number of turbine disks, means that only a single balancing step is required, rather than individual steps for each ring. The single rotor and blade component provides for easier alignment of the rotor and hence nozzle guide vanes with the casing, to permit correct mounting of the vanes thereon.

Various modifications may be made without departing from the scope of the invention. For instance, different mounting mechanisms or arrangements may be used than those outlined above. Whilst the above described invention relates to a five stage low pressure turbine module within a gas turbine engine, the invention is useable on turbines with differing numbers of stages, and is useable other than just on low pressure turbines.

Furthermore, the invention is also applicable to other gas or steam multi stage axial flow turbines. Moreover, the invention may be applicable to other rotating blade assemblies such as compressors.

We claim:

1. A method of forming a rotating blade assembly, the assembly including a rotor, a plurality of blades mountable on the rotor with some of the blades axially spaced relative to each other, and a casing in which the rotor is rotatably mountable, and a plurality of stators mountable on the casing such that the blades pass therebetween during rotation of the rotor, the method including mounting the blades on the rotor, locating removable supports on the blades, locating the stators on the removable supports in required positions, introducing the rotor into the casing, and mounting the stators to the casing.

2. A method according to claim 1, wherein the removable supports are located on the blades, and the stators are subsequently placed on the removable supports.

3. A method according to claim 1, wherein the removable supports are sacrificial.

4. A method according to claim 3, wherein the removable supports are frangible such that upon rotation of the rotor the supports will break up and be ejected from the casing.

5. A method according to claim 1, wherein one or more inner circumferential seals are mounted around the rotor extending between the blades following mounting of the blades on the rotor, and before locating the stators on the removable supports.

6. A method according to claim 5, wherein at least one of the inner circumferential seals is provided in two or more circumferential parts, which parts are located around the rotor and connected together to extend wholly therearound.

7. A method according to claim 1, wherein one or more outer circumferential seals are mounted around the inside of the casing, prior to introduction of the rotor thereinto.

8. A method according, to claim 1, wherein the rotor, following introduction into the casing, is aligned relative to the casing prior to mounting of the stators on the casing.

9. A method according to claim 1, wherein the rotor and casing are each located respectively on first and second assembly fixtures prior to introduction of the rotor into the casing, with the first assembly fixture rotatably engageable with the second assembly fixture to permit correct relative positioning of the rotor and casing, and to permit rotation of the rotor relative to the casing into a required relative alignment.

10. A method according to claim 1, wherein the blades comprise turbine blades and the stators comprise nozzle guide vanes.

* * * * *